Sept. 9, 1930.  W. V. BRAYBON ET AL  1,775,189
BUTTER DIVIDING MACHINE
Filed Sept. 28, 1929   3 Sheets-Sheet 2

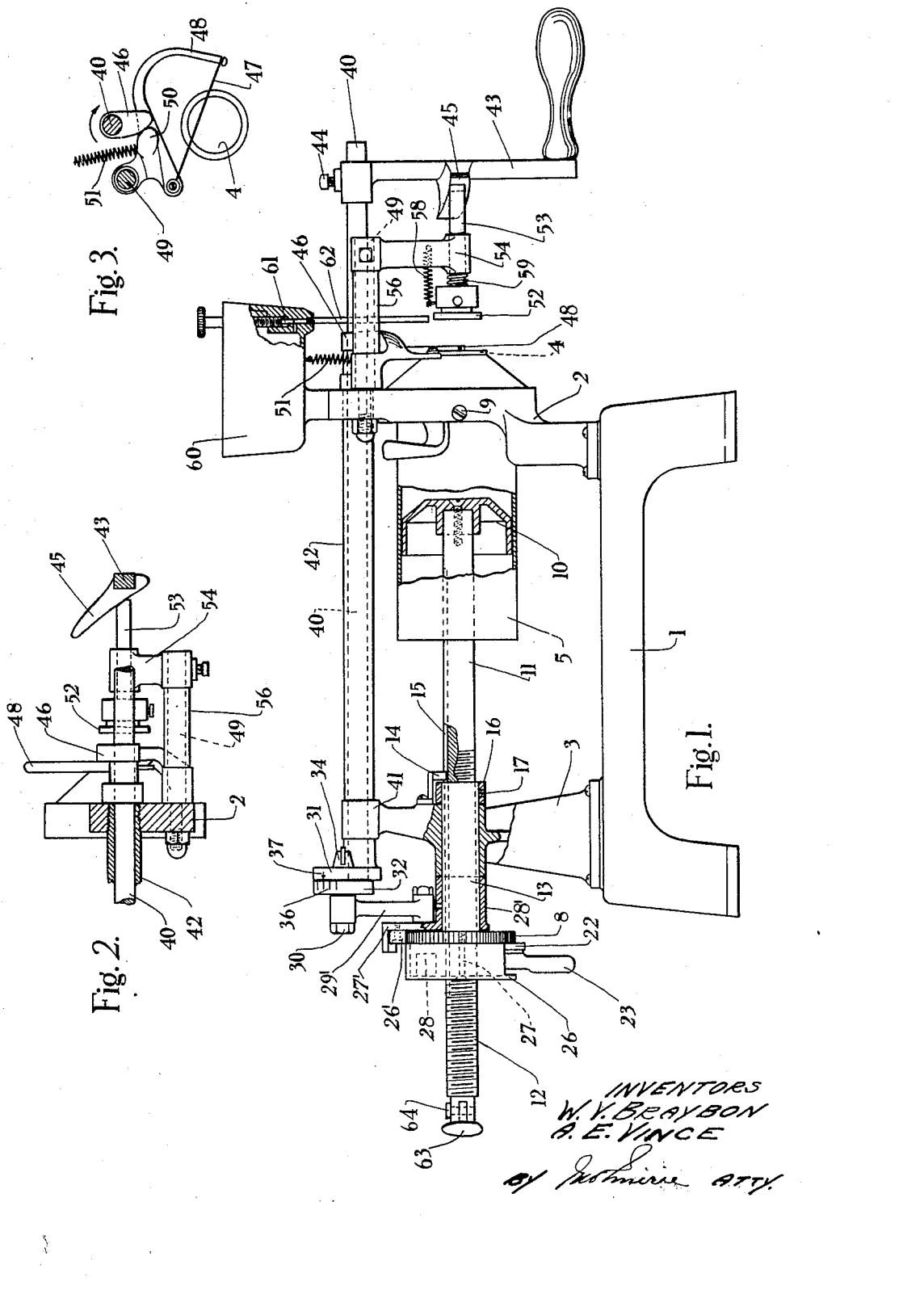

INVENTORS
W.V. BRAYBON
A.E. VINCE

Patented Sept. 9, 1930

1,775,189

UNITED STATES PATENT OFFICE

WILFRID VINCENT BRAYBON AND ALBERT EDMUND VINCE, OF HASTINGS, ENGLAND

BUTTER-DIVIDING MACHINE

Application filed September 28, 1929, Serial No. 395,845, and in Great Britain May 4, 1929.

The invention relates to improvements in machines for dividing butter or the like plastic material into small portions or so-called pats and particularly machines of the known type in which butter in a container is extruded by a piston through a nozzle and is cut into pats by a cutter moving across the extrusion nozzle, the butter container sometimes being removable to facilitate charging and cleaning.

One object of the invention is to render the machine easy to operate both as regards extrusion and cutting of the butter into pats and if required stamping the butter, and also as regards the easy and rapid withdrawal of the extrusion piston from the container to permit of rapid recharging.

Another object is to provide simple means by which the amount of butter extruded at each operation may be easily varied or regulated so that pats of required weight can be cut off, these regulating means being, if desired, adapted to indicate the weight of pat cut off.

Another object is to provide simple and efficient stamping and cutting means, preferably operable by the same driving shaft which operates the mechanism for moving the piston to extrude the butter. A further object is to provide simple means for permitting the easy and rapid attachment and detachment of the butter container.

A still further object is to provide simple means for moistening the cutter and the stamp so as to avoid adherence of the stamp and cutter to the butter and the adherence of the divided portions or pats of butter to one another.

With these objects in view the invention consists in the construction, combination and arrangement of parts hereinafter described and as claimed in the appended claims.

In the accompanying drawings:

Figure 1 is a side elevation, parts being broken away to show other parts.

Figure 2 is a plan of part of one end of the machine showing the stamping mechanism.

Figure 3 is an end view of part of the machine showing the cutting mechanism.

Figure 4 is an end elevation of the split nut and crank drive mechanisms, while.

Figure 4:
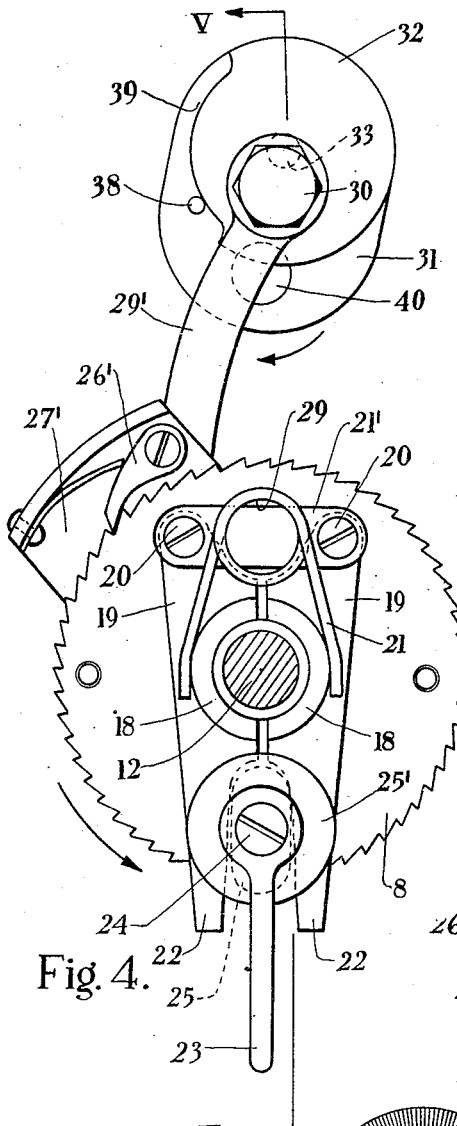

The machine illustrated comprises a base 1 provided with two standards or brackets 2 and 3. The bracket 2 is provided with an extrusion nozzle 4 the orifice of which may be circular or of any desired shape according to the shape of the butter pats it is desired to produce. Interchangeable bushes of various shapes may be provided to vary the size and shape of the orifice.

A cylindrical butter container 5 which is open at both ends has a flange 6 which is slotted at 7 and provided with helical surfaces 8'. Pins 9 on the bracket 2 engage with the surfaces 8 when the end of the container 5 is thrust into the bracket with the slots 7 opposite to the pins and is partially rotated, the arrangement effecting a firm connection permitting of quick detachment somewhat similarily to a bayonet joint.

Figure 5:
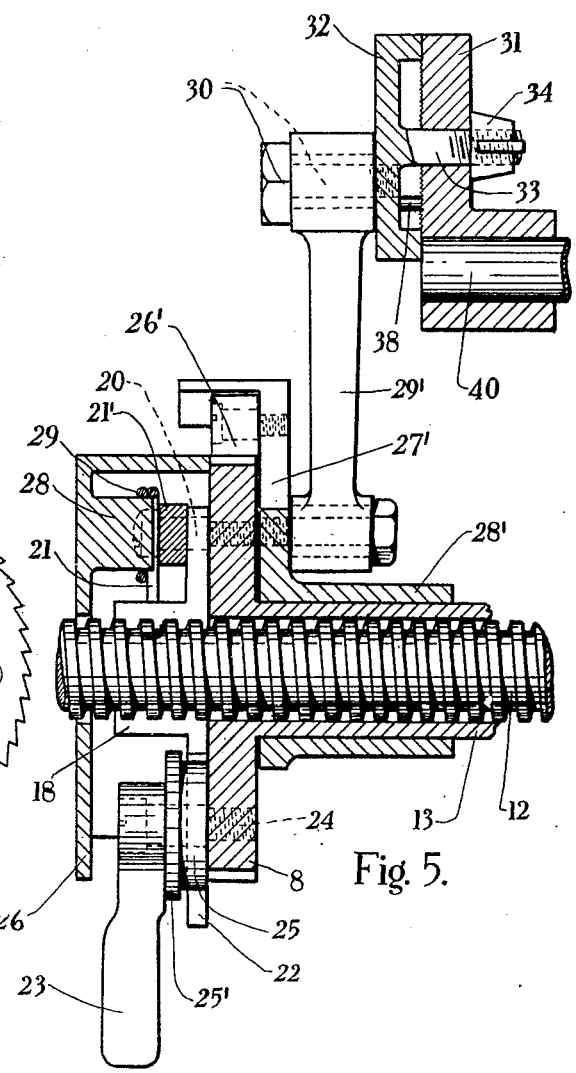
Figure 5 is a side sectional elevation on the line V—V, Figure 4.
Figure 6:
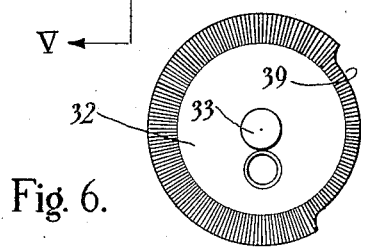
Figures 6 and 7 are elevations of portions of the crank drive mechanism.
Figure 7:
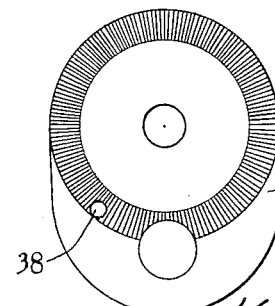
Figure 8:
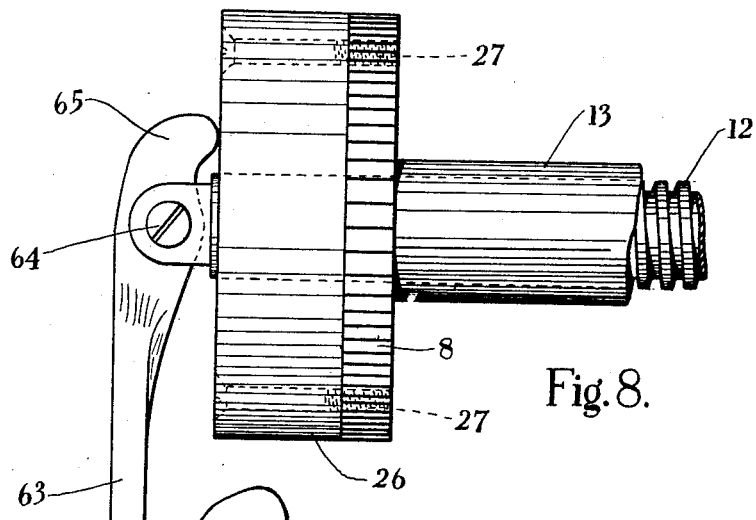
Figure 8 is an outside plan of part of the split nut end of the machine.
Figure 9:
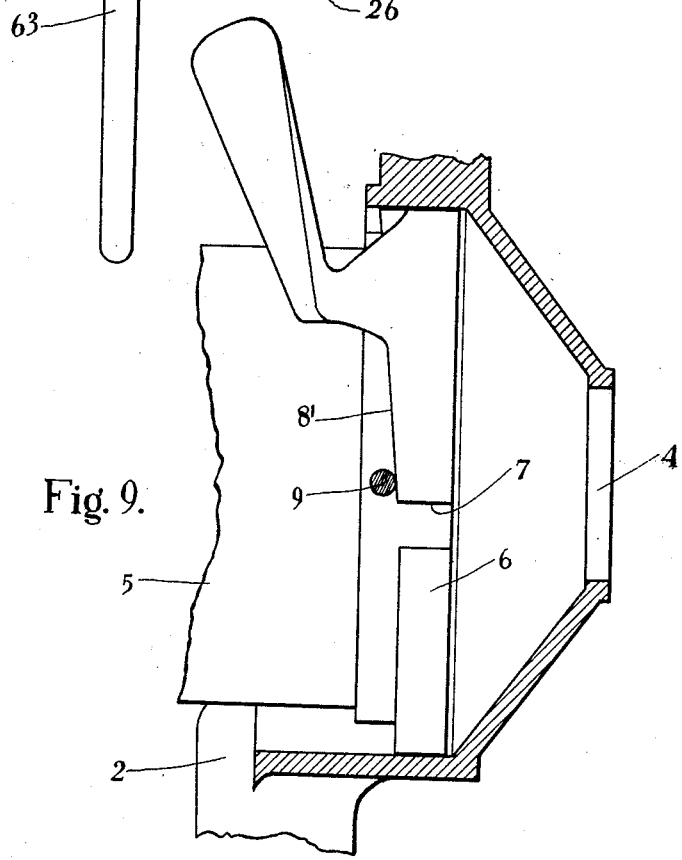
Figure 9 is a sectional elevation showing the flanged end of the butter container and the extrusion orifice.

An extrusion piston 10 has a piston rod 11 which is screw threaded at 12 for a part of its length. The piston rod 11 is mounted to slide in a sleeve 13 carried by the bracket 3. It is prevented from rotating by means of a key 14 which is fixed to the bracket 3 and enters a keyway or longitudinal slot 15 in the piston rod 11. One end of the sleeve 13 has a collar 16 secured to it by a grub screw 17. The other end of the sleeve carries a ratchet wheel 8 which may be formed integrally with it as shown more clearly in Figure 5. Two parts 18, 18, of a divided nut are pivotally mounted on the ratchet wheel 8, for example, each is formed integrally with a lever 19 which is pivotally mounted on a stud 20. The two studs 20 also pass through a washer or cross piece 21'. The levers 19 are forced towards one another by a spring, such as a wire spring 21, to close the parts of nut 18, 18, into engagement with the screw threaded portion 12 of the piston rod 11. The ends 22 of the lever 19 are spaced apart even when the levers are otherwise close together.

A hand lever 23 pivoted to the ratchet wheel 8 by means of a stud 24 has a cam 25 situated in space between the parts 22 of the levers 19, the levers 23 having a flange 25' extending over the parts 22. A cover 26 fixed to the ratchet wheel 8 for instance by screws 27, has a boss 28 on which the loop 29 of the spring 21 is freely mounted. When the parts 18, 18, of the nut are to be disengaged from the screw threaded portion 12 of the piston rod 11 the hand lever 23 is swung about the stud 24 through about 90° so that the cam 25 similarly rotated thrusts the levers 19 apart and holds them in that position against the action of the spring 21. When the lever 23 is moved back again the spring returns and holds the parts 18, 18 of the nut in engagement with the screw threaded portion 12 of the piston rod 11.

The ratchet wheel 8 is partially rotated intermittently by means of a pawl 26' pivotally mounted on a lever 27' which has a tubular boss 28' freely mounted on the sleeve 13, the boss 28' also forming a distance piece between the ratchet wheel 8 and the bracket 3.

The pawl lever 27' is connected by a connecting rod 29' to a screw stud or crank pin 30 which is not directly connected to its crank 31 but is screwed to a disc 32 and is eccentric to a central screw stud 33 conveniently formed integrally with the disc 32 and secured by a fly nut 34 to the crank 31. When the fly nut 34 is slackened the disc 32 can be partially rotated relatively to the crank 31 and consequently the radius of the crank pin 30 from the geometrical centre of rotation of the crank, namely, the throw of the crank can be varied for the purpose of varying the degree of rotation of the divided nut 18, 18, and consequently the extrusion motion of the piston 10 to suit the amount of butter to be extruded at each operation of the crank 31.

The edge of the disc 32 may be provided with a scale 36, Figure 1, which in conjunction with a pointer 37 will indicate the adjustment. The scale may be graduated to indicate the weights of the butter pats cut off, for instance, it may indicate the number of pats to the pound of butter.

The adjacent faces of the disc 32 and of the crank 31 are preferably serrated. In order to limit the range of rotation of the disc 32 relatively to the crank 31, the latter is provided with a stop pin 38 and a corresponding part of the disc 32 has a recess as indicated at 39 in Figure 4 to receive the pin 38.

The crank 31 is fixed to a shaft 40 which is supported by the brackets 2 and 3 and extends from one end of the machine to the other and forms the main or operating shaft of the machine. It is supported near one end in a bearing 41 on the bracket 3 and passes through a tubular distance piece 42 which is screwed into the bracket 2.

The shaft 40 is provided with a hand crank 43 which is adjustably secured to it for example by a set screw 44. The hand crank 43 conveniently carries a cam 45 for operating a stamp. A cam 46 on the shaft 40 operates a cutter. The cutter in the form shown comprises a string 47 stretched tightly across a bow 48 which is pivotally mounted on a stud 49 on the bracket 2 and has a rounded projection 50 for engagement with the cam 46, a spring 51 attached to the bow 48 and to the bracket 2 returning the cutter to its normal position each time that the cam 46 moves it across the face of the extrusion nozzle.

A stamp 52 which is preferably of wood or fibre is provided with a stem 53 which is mounted to slide in a bracket 54 carried by the stud 49 passing through a distance sleeve 56 and the bracket 2. The end of the stem 53 is engaged by the cam 45, it being thrust towards the extrusion nozzle 4 by the cam 45 and returned to its normal position by a spring 58 attached to the stamp and to the bracket 54. A cushioning spring 59 is preferably provided between the stamp and the bracket 54.

A water vessel 60 is mounted on the bracket 2 and is provided with a needle valve 61 and a drip-pipe 62 for feeding to the stamp.

Assuming that the machine has been in use and the piston 10 has reached the end of its inward travel in the butter container 5 a small amount of compressed butter will be left in the extrusion nozzle 4 and consequently if any attempt be made to withdraw the piston 10 from the container 5 a vacuum will be momentarily created.

In order to enable sufficient purchase to be available to render the initial withdrawal movement easy, suitable means such as a lever 63 is provided. The lever 63 is pivotally mounted at 64 on the end of the piston rod 11 and when the piston 10 is in its innermost position the end 65 of the lever 63 will be close to the cover 26.

In order to enable the piston 10 to be withdrawn and the container 5 to be recharged the hand lever 23 is first moved through about 90° to separate the parts 18, 18, of the divided nut and to disengage it from the screw threaded portion 12 of the piston rod 11.

The hand lever 63 is then grasped by the operator's hand and pulled to the rear so that the end 65 bears on the cover 26 and sufficient purchase is obtained to start the withdrawal of the piston 10 until air is drawn in past the butter in the nozzle to break the vacuum in the container. The piston 10 can then be withdrawn by the lever 63 rapidly and easily.

The container 5 is then rotated sufficiently to permit of disengagement of its slotted flange 6 from the pins 9 on the bracket 2, the pins 9 being then opposite to the slots 7. The container is removed, recharged with butter and replaced. The piston 10 is then thrust into the container until it is in contact with the butter therein. The lever 23 is moved back through about 90° so that its cam 25 releases the levers 19 which, under the action of the spring 21 close and engage the parts 18, 18, of the divided nut with the screw threaded portion 12 of the piston rod 11.

The hand crank 43 is then rotated to rotate the main or operating shaft 40. The crank 31 then operates the ratchet wheel 8 through the medium of the connecting rod 29', pawl lever 27' and pawl 26', so that the parts 18, 18, of the nut are rotated and the piston rod 11, and extrusion piston 10 are caused to move forward intermittently compressing the butter in the container 5 and extruding butter from the nozzle 4. As each extrusion occurs the cam 40 moves the cutter 47 across the extruded butter and cuts off a pat. Before this occurs the butter at the nozzle is stamped by the stamp 52, the cam 45 on the hand crank 43 forcing the stamp into engagement with the butter and allowing it to recede in time for the cutter 47 to descend.

If desired the cylindrical butter container may be lined with porcelain, glass or the like.

We claim:

1. A butter dividing machine comprising a container for butter, having an extrusion nozzle, a piston in said container for extruding said butter, a screw-threaded piston rod and a nut for moving said piston slowly to extrude butter from the container, means for disengaging the nut from the screw threaded piston rod to permit of rapid withdrawal of the piston from the container, a stop and a lever pivotally mounted on the outer end of the piston rod and adapted to co-act with said stop to facilitate an initial movement of the piston rod when the nut is disengaged therefrom, to break the vacuum in the container and thereby to permit of easy withdrawal of the piston from the container, substantially as hereinbefore set forth.

2. A butter dividing machine comprising a butter container having an extrusion nozzle, an extrusion piston in said container, having a screw-threaded piston rod, a nut for engagement with said piston rod, a pawl and ratchet wheel for rotating said nut to effect the movement of the piston during extrusion of the butter, an oscillatory lever for carrying the pawl, a crank and connecting rod for oscillating said lever, a shaft carrying said crank at one end, a hand crank at the other end of said shaft, a reciprocatory stamp for stamping the butter extruded from the extrusion nozzle, a spring for moving said stamp away from the butter and a cam on said hand crank for moving said stamp against the action of said spring into contact with the butter.

3. In a butter dividing machine according to claim 2, a string bow pivotally mounted on the framework of the machine adjacent to the extrusion nozzle of the butter-container, and a cam on the crank shaft which is fitted with the hand crank, for engaging with and moving said string bow across the face of the extruding nozzle to cut off the extruded butter into pats, and a spring for returning said string bow to its normal position, substantially as hereinbefore set forth.

In testimony whereof we have signed our names to this specification.

WILFRID VINCENT BRAYBON.
ALBERT EDMUND VINCE.